United States Patent
Caucheteux et al.

(10) Patent No.: US 8,740,553 B2
(45) Date of Patent: Jun. 3, 2014

(54) NOZZLE STAGE FOR A TURBOMACHINE COMPRESSOR

(75) Inventors: Mathieu Caucheteux, Creteil (FR); Christophe Jacq, Courpalay (FR)

(73) Assignee: Snecma, Paris (FR)

( * ) Notice: Subject to any disclaimer, the term of this patent is extended or adjusted under 35 U.S.C. 154(b) by 561 days.

(21) Appl. No.: 12/981,936

(22) Filed: Dec. 30, 2010

(65) Prior Publication Data
US 2011/0164971 A1    Jul. 7, 2011

(30) Foreign Application Priority Data

Jan. 5, 2010 (FR) ...................... 10 00027

(51) Int. Cl.
*F01D 9/04*    (2006.01)
(52) U.S. Cl.
USPC .............. 415/173.1; 415/190; 415/209.4; 415/210.1
(58) Field of Classification Search
USPC .......... 415/173.4, 173.5, 209.2–209.4, 210.1, 415/189, 190
See application file for complete search history.

(56) References Cited

U.S. PATENT DOCUMENTS

| 5,332,360 A | * | 7/1994 | Correia et al. | ............. 415/209.3 |
| 6,042,334 A | * | 3/2000 | Schilling | .................... 415/173.7 |

FOREIGN PATENT DOCUMENTS

| EP | 0 980 963 A2 | 2/2000 |
| FR | 2 922 950 A1 | 5/2009 |

OTHER PUBLICATIONS

French Preliminary Search Report issued May 11, 2010, in French 1000027, filed Jan. 5, 2010 (with English Translation of Category of Cited Documents).

* cited by examiner

*Primary Examiner* — Edward Look
*Assistant Examiner* — Maxime Adjagbe
(74) *Attorney, Agent, or Firm* — Oblon, Spivak, McClelland, Maier & Neustadt, L.L.P.

(57) ABSTRACT

The invention relates to a nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened. The radially inner ends of the vanes are plane and do not have any projecting tenons.

13 Claims, 4 Drawing Sheets

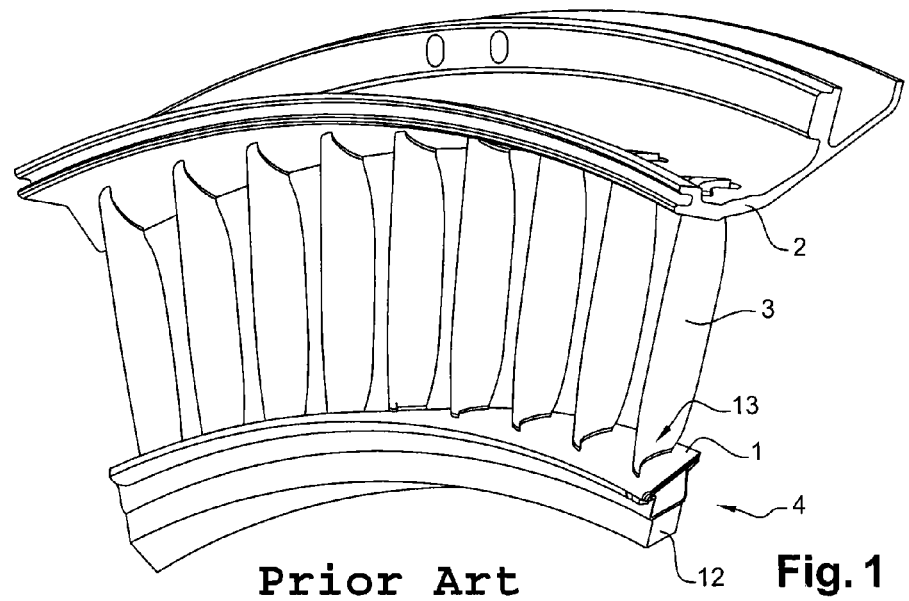
Prior Art    Fig. 1
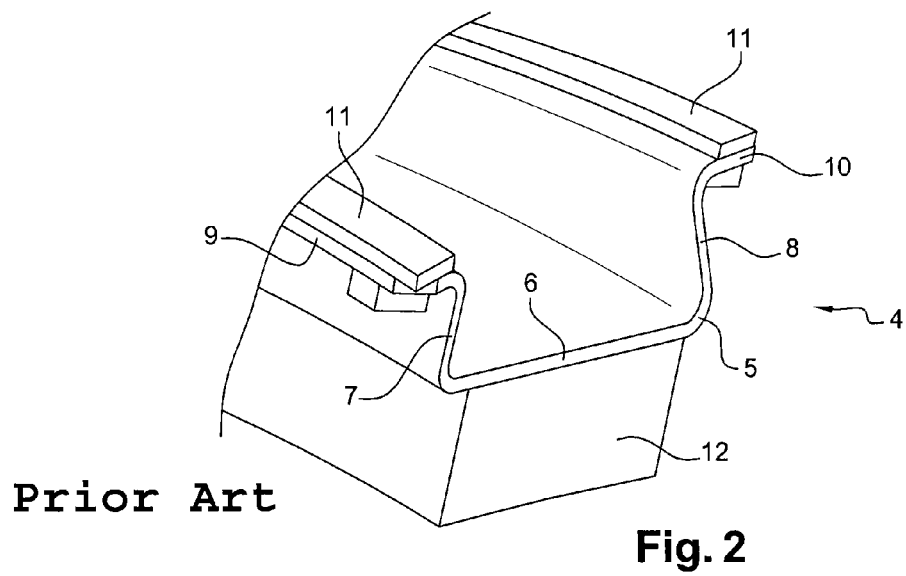
Prior Art    Fig. 2

NOZZLE STAGE FOR A TURBOMACHINE COMPRESSOR

FIELD OF THE INVENTION

The present invention relates to a nozzle stage for a compressor of a turbomachine, such as an airplane turboprop or turbojet.

BACKGROUND OF THE INVENTION

Such a nozzle stage is described in document FR 2 922 950 in the name of the Applicant, and it comprises two coaxial shrouds, a radially inner shroud and a radially outer shroud, together with radial vanes extending between the shrouds and connected via their ends to the shrouds, and also a support for abradable material that is mounted by crimping to the upstream and downstream edges of the inner shroud.

In known manner, the inner shroud presents openings having the radially inner ends of the vanes inserted and fastened therein.

More precisely, the radially inner ends of the vanes include tenons that project along the axes of the vanes. The shroud is made of two superposed annular sheets, an outer sheet and an inner sheet, that are fastened together by brazing, the outer sheet presenting openings in which the radially inner ends of the vanes are mounted, the inner sheet presenting openings for receiving the above-mentioned tenons, and being crimped via their upstream and downstream edges onto the support for abradable material.

The radially inner ends of the vanes thus bear radially against the inner annular sheet, and they are also held axially by the tenons that are engaged in the openings in the inner annular sheet. The radially inner ends of the vanes are fastened by brazing to the annular sheets.

Such a structure presents the drawbacks set out below.

Firstly, the crimping of the abradable support to the inner shroud is performed by folding the upstream and downstream edges of the inner annular sheet, thereby damaging the brazing between the two annular sheets at said edges. The outer annular sheet may separate a little from the inner annular sheet, in particular at the upstream edge, thereby requiring manual re-touching at the end of fabrication, or else a maintenance operation when the separation is detected during a subsequent maintenance inspection.

Furthermore, the inner annular sheet is stressed simultaneously by the crimping of its upstream and downstream edges, by the brazing of the tenons of the vanes, and by the brazing of the outer annular sheet. This requires the shape of the inner sheet to be under perfect control, since it is taken to its capacity limit for shaping.

Finally, such a structure makes it necessary simultaneously to make openings through the inner sheet and openings through the outer sheet, and to use vanes that are complex in structure, presenting tenons at their radially inner ends, in order to retain the vanes radially.

OBJECT AND SUMMARY OF THE INVENTION

A particular object of the invention is to provide a solution to these problems that is simple, effective, and inexpensive.

To this end, the invention provides a nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened, wherein the radially inner ends of the vanes are plane and do not have any projecting tenons, and wherein at least one annular strip of sheet metal is fastened by brazing to the inner face of the outer shroud and extends through the ends of the openings in the inner shroud, thereby forming radial bearing points for the ends of the vanes.

The structure of the vanes and of the inner shroud may then be simplified, firstly reducing the cost of making them, and secondly reducing assembly difficulties during fabrication.

In an embodiment of the invention, the annular strip is a curved bar fastened, e.g. by brazing, to the radially inner face of the inner shroud in the middles of the above-mentioned openings, the radially inner end of each vane bearing radially against the curved bar.

In this manner, the radially inner ends of the vanes are held radially by the curved bar and are held axially in the openings in the inner shroud.

Furthermore, the shroud no longer comprises two sheets that are superposed and brazed together, such that crimping the support of the abradable material does not give rise to the above-mentioned separation, unlike the prior art.

In another embodiment of the invention, the annular strip is an inner annular sheet fixed by brazing to the inner shroud and crimped via its upstream and downstream edges to the support of abradable material.

The radially inner ends of the vanes are then held radially by the inner annular sheet and they are held axially in the openings in the inner shroud.

In yet another embodiment of the invention, two annular strips of sheet metal, respectively an upstream strip and a downstream strip, are fastened by brazing to the inner face of the inner shroud and are crimped via one edge to an upstream edge or a downstream edge respectively of the support of the abradable material.

The radially inner ends of the vanes are then held radially by the annular strips, and they are held axially in the openings in the inner shroud.

In another variant embodiment of the invention, the annular sheet-metal strip is fastened to the inner face of the inner shroud through upstream or downstream ends of the openings for forming radial bearing points for the vanes, said annular strip being crimped via an upstream or downstream edge to the upstream or downstream edge respectively of the support of the abradable material.

Under such circumstances, a downstream or upstream edge respectively of the inner shroud is fastened by crimping to the support of the abradable material.

Advantageously, the radially inner ends of the vanes are fastened by brazing in the openings of the inner shroud.

The invention also provides a turbomachine, such as an airplane turboprop or turbojet, including a nozzle stage of the invention.

BRIEF DESCRIPTION OF THE DRAWINGS

The invention can be better understood and other details, characteristics, and advantages of the invention appear on reading the following description made by way of nonlimiting example with reference to the accompanying drawings, in which:

FIG. 1 is a perspective view of a sector of a prior art nozzle stage;

FIG. 2 is an enlarged view of a portion of FIG. 1 showing the layer of abradable material and its support;

MORE DETAILED DESCRIPTION

Figure 3:
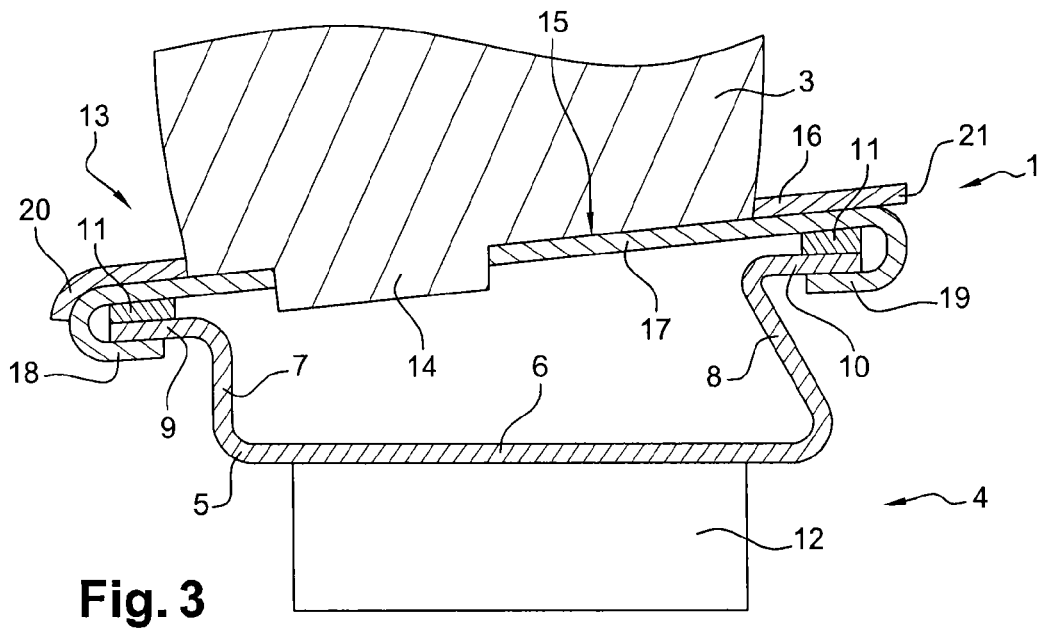
FIG. 3 is an axial section view of a radially inner portion of the prior art nozzle stage.

FIGS. 1 to 3 show a sector of a prior art nozzle stage for a turbomachine, such as an airplane turboprop or turbojet.

This nozzle stage comprises two coaxial shrouds, a radially inner shroud 1 and a radially outer shroud 2, together with a radial vanes 3 extending between the shrouds 1 and 2, and connected to the shrouds via their ends.

A strip 4 of abradable material is crimped on the inner shroud 1, this strip 4 being more clearly visible in FIGS. 2 and 3. This strip 4 is fastened to the support 5 of sheet metal having a section that is generally Omega-shaped. The support thus presents a base 6, from which there extend two branches, an upstream branch 7 and a downstream branch 8, the branches facing radially outwards.

The ends of the upstream and downstream branches form edges 9 and 10 that are folded respectively upstream and downstream.

Reinforcing strips 11 are brazed to the radially outer faces of the upstream and downstream edges 9 and 10.

The abradable material 12 is fastened to the radially inner face of the base 6.

The radially inner end 13 of each vane 3 includes a tenon 14 (FIG. 3) of constant section that projects radially inwards and that presents a section that is smaller than the remainder of the vane 3, so as to form a shoulder 15.

The inner shroud 1 comprises two annular metal sheets, an outer sheet 16 and an inner sheet 17, which sheets are superposed and fastened together by brazing.

The outer sheet 16 presents openings having the radially inner ends 13 of the vanes 3 inserted therein, and the inner sheet 17 presents openings having the tenons 14 inserted therein. The shoulder 15 of each vane thus rests radially against the outer face of the inner sheet 17, and the inner end 13 of the vane is held axially in position by the tenon 14 engaged in the opening in the inner sheet 17.

The radially inner ends 13 of the vanes 3 are fastened by brazing to the inner and outer sheets 17 and 16.

The upstream and downstream edges 18 and 19 of the inner sheet 17 are folded over the upstream and downstream edges 9 and 10 of the support 5 of the abradable material, so as to crimp it to the inner shroud 1.

The upstream edge 20 of the outer sheet 16 is curved and pressed against the folded portion of the upstream edge 18 of the inner sheet 17. The downstream end 21 of the outer sheet 16 is straight.

As mentioned above, such a structure is complex, difficult to implement, and raises problems of the upstream edge 20 of the outer sheet 16 separating during the crimping operation.

Figure 4:
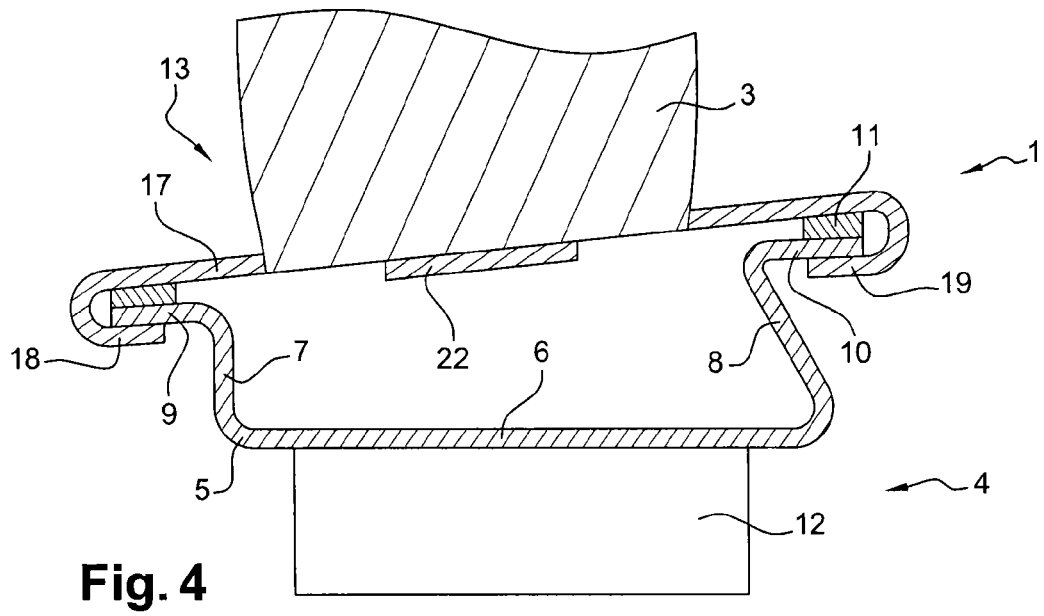
FIG. 4 is a view corresponding to FIG. 3, showing an embodiment of the invention.

FIG. 4 shows a first embodiment of the invention that differs from the embodiment described above in that the inner shroud 1 has only one single sheet 17, having upstream and downstream edges 18 and 19 that are folded onto the upstream and downstream edges 9 and 10 of the support 5 of the abradable material 12 in such a manner as to crimp said support to the inner shroud 1. The sheet 17 also includes openings having the radially inner ends 13 of the vanes 3 inserted therein.

Furthermore, the radially inner ends 13 of the vanes 3 are plane and they do not include any tenons 14.

A curved annular bar 22 is fastened by brazing to the inner face of the sheet 17, substantially in the middles of the openings in the sheet 17, such that the radially inner ends 13 of the vanes 3 bear against the bar 22. The ends 13 of the vanes 3 are fastened to the bar 22 and to the sheet 17 by brazing.

In this manner, the radially inner ends 13 of the vanes 3 are held radially by the curved bar 22 and they are held axially in the openings in the sheet 17.

This embodiment presents the following advantages: one of the annular sheets of the inner shroud is replaced by a curved bar, which bar is very simple to fabricate and does not require great precision in positioning. It also reduces the weight of the nozzle. Furthermore, the vanes do not have any tenons.

Figure 5:
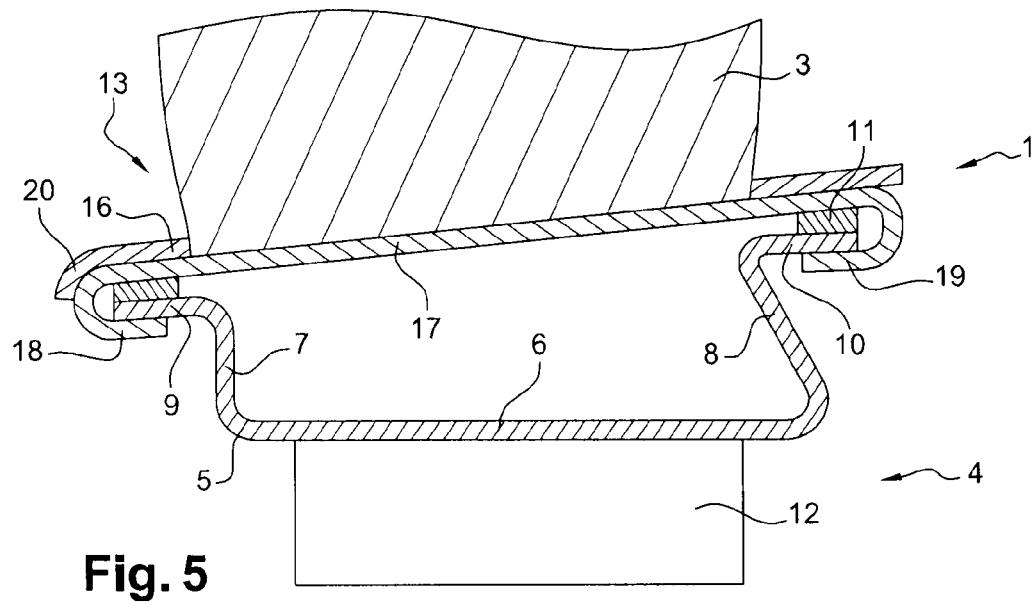
FIGS. 5 to 8 are views corresponding to FIG. 4, showing different variant embodiments of the invention.

A second embodiment is shown in FIG. 5. This embodiment differs from the embodiment of FIG. 3 in that the radially inner ends 13 of the vanes 3 do not have any tenons, and in that the radially inner sheet 17 does not have any openings.

In this manner, the radially inner ends 13 of the vanes 3 bear radially against the inner sheet 17 and they are held axially in the openings in the outer sheet 16.

The radially inner ends 13 of the vanes 3 are fastened by brazing to the inner and outer sheets 17 and 16.

Figure 6:
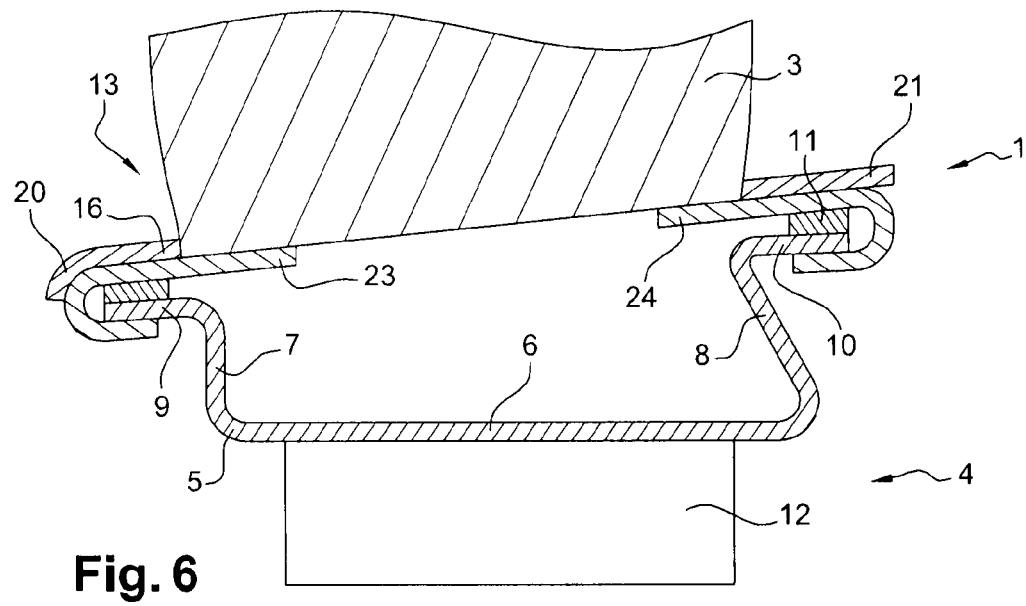

A third embodiment is shown in FIG. 6, in which the inner shroud 1 comprises an annular sheet 16 presenting openings for mounting the radially inner ends 13 of the vanes 3 and two inner annular strips of sheet metal, respectively an upstream strip 23 and a downstream strip 24, that are fastened by brazing to the inner face of the annular sheet 16 and that are crimped to the upstream and downstream edges 9 and 10 of the support 5 of the abradable material 12. Each annular strip 23 or 24 extends through the upstream or downstream ends of the openings in the annular sheet 16, and they form radial bearing points for the radially inner ends 13 of the vanes 3. As above, the radially inner ends 13 of the vanes 3 do not have any tenons.

Thus, these ends 13 bear radially against the strips 23 and 24, and they are held axially in the openings in the annular sheet 16.

Figure 7:
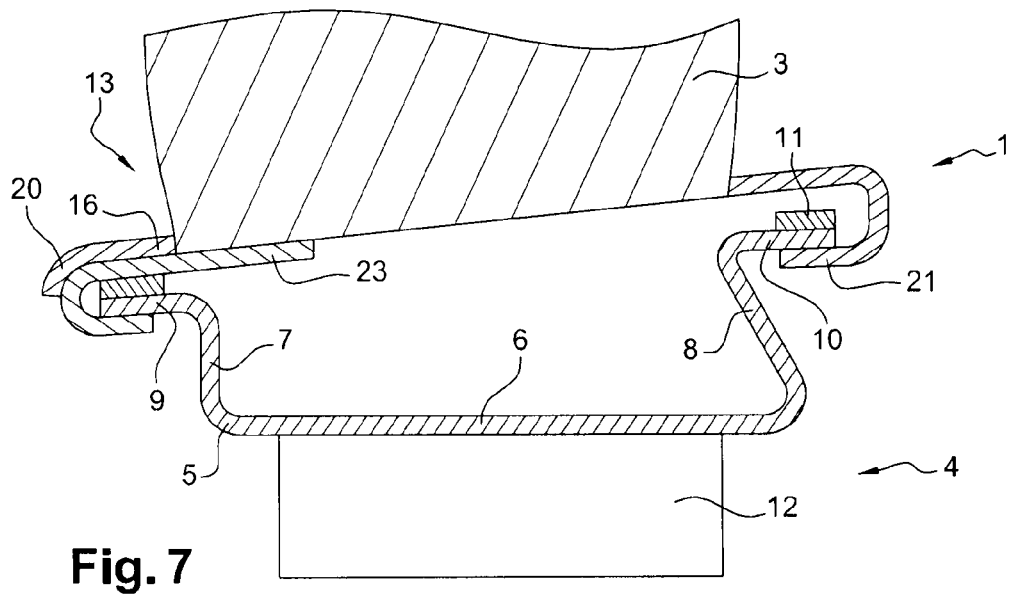

A fourth embodiment is shown in FIG. 7. This embodiment differs from the preceding embodiment in that the inner shroud 1 does not have a downstream annular strip 24, the downstream edge 21 of the annular sheet 16 being crimped on the downstream edge 10 of the support 5 of the abradable material 12.

Figure 8:
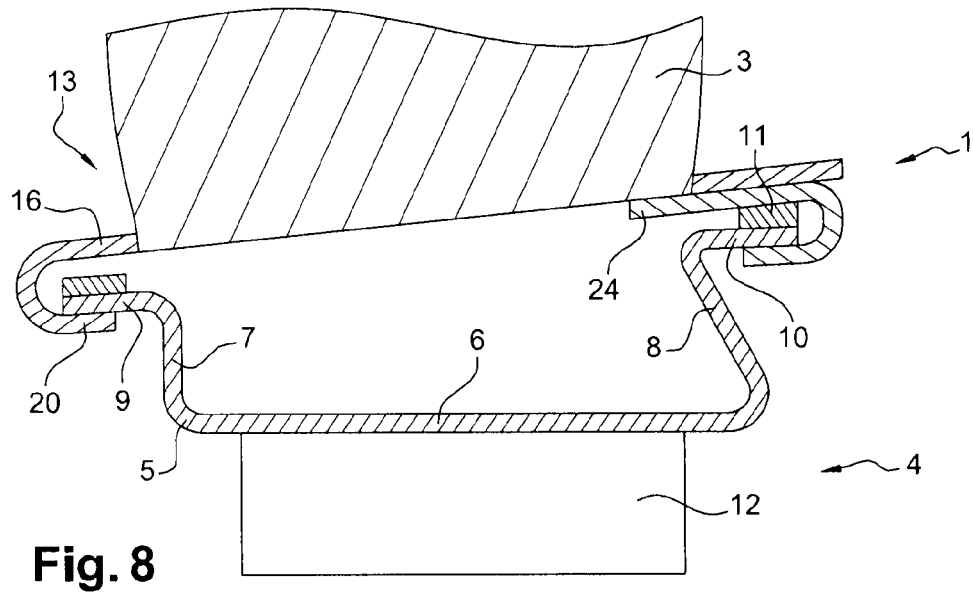

A fifth embodiment is shown in FIG. 8. This embodiment differs from the embodiment of FIG. 6 in that the inner shroud 1 does not have an upstream annular strip 23, the upstream edge 20 of the annular sheet 16 being crimped on the upstream edge 9 of the support 5 of the abradable material 12.

In the same manner as above, in FIGS. 7 and 8, the radially inner ends 13 of the vanes 3 are fastened by brazing to the annular sheet 16 and to the corresponding annular strip 23 or 24.

The ends 13 bear radially against the corresponding strip 23 or 24, and they are held axially in the openings in the annular sheet 16.

The clearance that can be seen on the downstream side in FIG. 7 and on the upstream side in FIG. 8 between the annular sheet 16 and a reinforcing strip 11 fastened on a rim 10 or 9 of the support 5, is shown solely for clarity of explanation, and it is eliminated when crimping the corresponding edge of the sheet 16 onto the support 5.

What is claimed is:

1. A nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened, wherein the radially inner ends of the vanes are plane and do not have any projecting tenons, wherein at least one annular strip of sheet metal is fastened by brazing to the inner face of the inner shroud and extends through the ends of the openings in the inner shroud, thereby forming radial bearing points for the ends of the vanes, wherein said at least one annular strip of sheet metal is free of any orifices for engaging tenons of the vanes, and wherein the annular strip is a curved bar fastened to the radially inner face of the inner shroud in the middles of the above-mentioned openings, the radially inner end of each vane bearing radially against the curved bar.

2. A nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened, wherein the radially inner ends of the vanes are plane and do not have any projecting tenons, wherein at least one annular strip of sheet metal is fastened by brazing to the inner face of the inner shroud and extends through the ends of the openings in the inner shroud, thereby forming radial bearing points for the ends of the vanes, wherein said at least one annular strip of sheet metal is free of any orifices for engaging tenons of the vanes, and wherein the annular strip is an inner annular sheet fixed by brazing to the inner shroud and crimped via its upstream and downstream edges to the support of abradable material.

3. A nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened, wherein the radially inner ends of the vanes are plane and do not have any projecting tenons, wherein at least one annular strip of sheet metal is fastened by brazing to the inner face of the inner shroud and extends through the ends of the openings in the inner shroud, thereby forming radial bearing points for the ends of the vanes, wherein said at least one annular strip of sheet metal is free of any orifices for engaging tenons of the vanes, and wherein two annular strips of sheet metal, respectively an upstream strip and a downstream strip, are fastened by brazing to the inner face of the inner shroud and are crimped via one edge to an upstream edge or a downstream edge respectively of the support of the abradable material.

4. A nozzle stage for a turbomachine compressor, the stage comprising two coaxial shrouds, a radially inner shroud and a radially outer shroud, and radial vanes extending between the shrouds and being connected via their ends to the shrouds, together with a support for abradable material that is mounted by crimping onto the upstream and downstream edges of the inner shroud, the inner shroud presenting openings in which the radially inner ends of the vanes are inserted and fastened, wherein the radially inner ends of the vanes are plane and do not have any projecting tenons, wherein at least one annular strip of sheet metal is fastened by brazing to the inner face of the inner shroud and extends through the ends of the openings in the inner shroud, thereby forming radial bearing points for the ends of the vanes, wherein said at least one annular strip of sheet metal is free of any orifices for engaging tenons of the vanes, and wherein the annular sheet-metal strip is fastened to the inner face of the inner shroud through upstream or downstream ends of the openings for forming radial bearing points for the vanes, said annular strip being crimped via an upstream or downstream edge to the upstream or downstream edge respectively of the support of the abradable material.

5. A nozzle stage according to claim 4, wherein a downstream or upstream edge respectively of the inner shroud is fastened by crimping to the support of the abradable material.

6. A nozzle stage according to claim 1, wherein the radially inner ends of the vanes are fastened by brazing in the openings of the inner shroud.

7. A turbomachine including a nozzle stage according to claim 1.

8. A nozzle stage according to claim 2, wherein the radially inner ends of the vanes are fastened by brazing in the openings of the inner shroud.

9. A turbomachine including a nozzle stage according to claim 2.

10. A nozzle stage according to claim 3, wherein the radially inner ends of the vanes are fastened by brazing in the openings of the inner shroud.

11. A turbomachine including a nozzle stage according to claim 3.

12. A nozzle stage according to claim 4, wherein the radially inner ends of the vanes are fastened by brazing in the openings of the inner shroud.

13. A turbomachine including a nozzle stage according to claim 4.

* * * * *